UNITED STATES PATENT OFFICE.

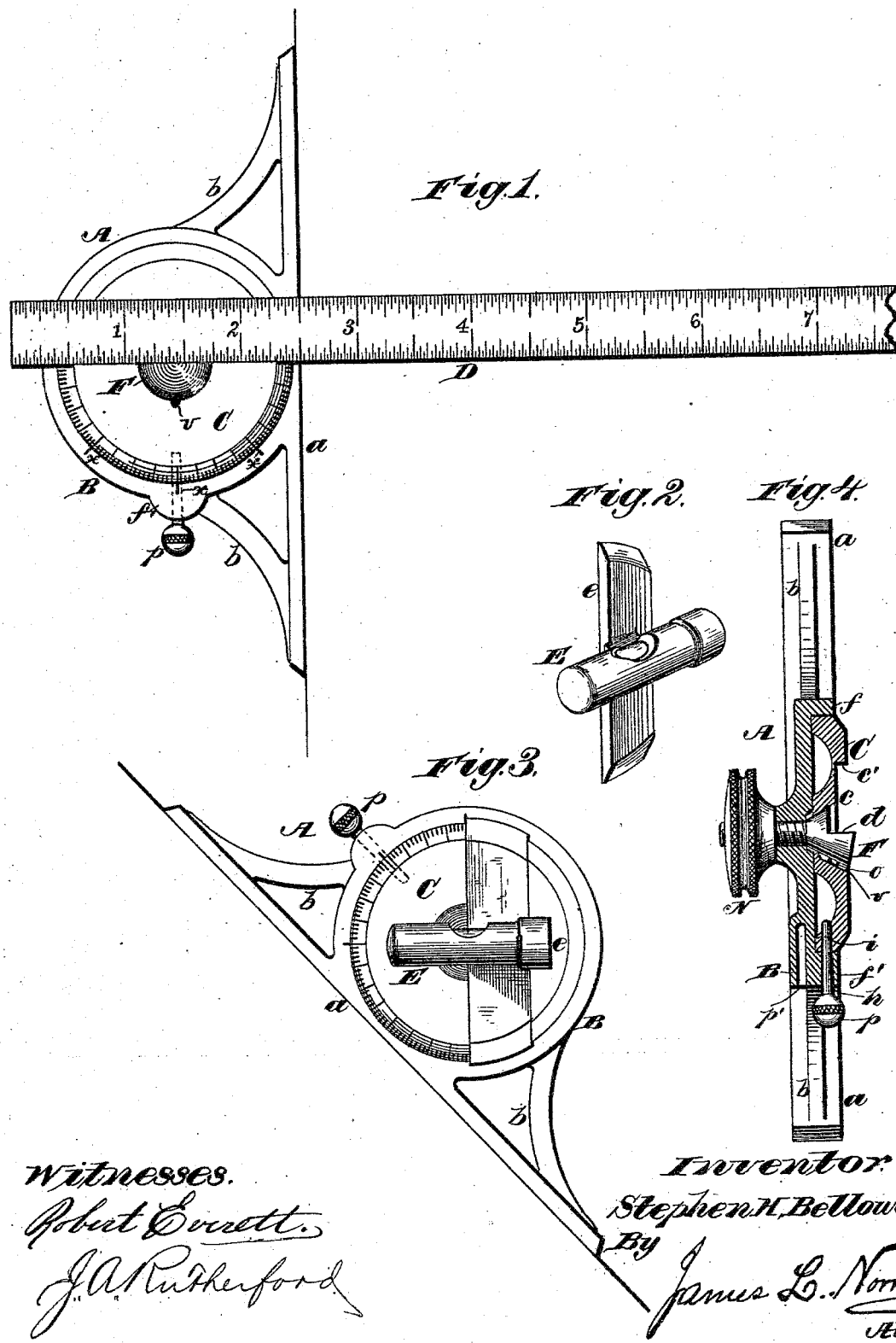

STEPHEN H. BELLOWS, OF ATHOL, MASSACHUSETTS.

COMBINED BEVEL AND T-SQUARE.

SPECIFICATION forming part of Letters Patent No. 295,100, dated March 11, 1884.

Application filed January 7, 1884. (No model.)

*To all whom it may concern:*

Be it known that I, STEPHEN H. BELLOWS, a citizen of the United States, residing at Athol, in the county of Worcester and State of Massachusetts, have invented new and useful Improvements in Combination-Tools, of which the following is a specification.

My invention relates to what may be termed a "combination tool or instrument," and is an improvement on the invention shown by me in a prior application filed May 14, 1883, Serial No. 94,829; and its object is to extend the scope of usefulness of that invention, the tool or instrument hereinafter described being adapted to be used, at will, either as a square or protractor, or as a beveling-instrument, or as a spirit-level. In my invention, within the recess of a circularly-flanged base suitably supported from a straight-edge is placed a disk capable of rotation therein, the disk having at its center a beveled opening for the seat of a conical-headed screw which passes therethrough and through the base, a nut taking upon its outer end, so that the base and disk may be firmly clamped together at any desired position. A spline or feather is made upon the conical head of the screw, there being a corresponding recess in the beveled opening of the disk, so that the screw may be prevented from turning when the nut is operated. Just at one side of the diameter of this disk is cut a groove, one-half about of the head of the screw being cut away, so that at the center of the disk the side walls of the groove are formed partly by the disk, partly by the conical screw-head. In the flange of the base an aperture is made, through which may pass a tapering pin taking in holes made at any desired or suitable points in the periphery of the rotatable disk, the tapering pin then locking the two together at such points, and thus securing perfect accuracy. The disk is graduated, for convenience, at its edge, and the base may be furnished with index-marks, so that the angular relation of the two and of the groove mentioned to the base may be readily determined. A graduated rule of any desired length, and of a width just to take readily into this groove, is used. There is also provided a bubble-glass or spirit-level attached to a strip, preferably of a length equal to the diameter of the disk and of the width of the rule. When it is desired to use the instrument as a square, protractor, or beveling-instrument, the rule is placed in the groove in the disk and the disk turned until its graduation-marks indicate the proper angle. The nut then being turned, the conical head of the screw acts as a wedge, firmly fastening the rule to the disk and the disk to the frame of the apparatus and at the proper angle. If at this angle the hole in the flange of the base and any of those in the disk coincide, the tapering pin may be used to also aid in securing them in the desired relation. When it is desired to use the instrument as a level, the nut is loosened, the rule removed, and the piece carrying the bubble-glass or spirit-level substituted. This construction and operation may be more readily understood from the following detailed description and the drawings, in which—

Figure 1 is a plan view of the instrument used as a square or protractor; Fig. 2, a view of the detachable level or bubble-glass and support; Fig. 3, a plan view used as a level; and Fig. 4 a view partly in section, with both rule and level detached therefrom.

A is the frame of the instrument, having a straight-edge, *a*, from which is suitably supported—say by arms or braces *b*—the base B having circular flanges *f*. Within the recess formed in B by this flange *f* is used the disk C, rotatable therein and graduated with the degrees of a circle at its edge, index-marks *x* (as many as desired) being made upon the edges of *f*. In the center of C is made a conical opening to receive the conical head of the screw F, the stem of the screw passing through B, and being provided at its outer end with the nut N for its control. Upon the head of F may be a feather or spline, *o*, taking into a corresponding recess, *v*, in the screw-seat in C, to prevent the screw turning in its seat upon operation of N. Upon one side of the line of the diameter of C is formed a groove, *c*, a portion of the head of screw F being cut away at a slight bevel, or being cut slightly under to draw the blade down, as shown at *d*, so that the surface of the cut-away portion may or about may coincide with those of *c* and form part of the groove. The face of C projects beyond the flange *f* sufficiently to permit the bottom of the groove *c* to be slightly out of the plane of the edge of *f*. A portion of the flange *f* may be made heavier or larger, as shown at *f'*, and an aperture, *h*, made therethrough, there being in C a series or number of apertures, *i*. A tapering pin, *p*, is used, which, passing through aperture *h* in base B, takes into the desired aperture *i* in disk C, and locks or aids in locking said base and disk firmly together, securing perfect accuracy of adjustment. A supplementary aperture, *h'*, is provided in B for the reception of the pin *p* when not in active use. A rule, D, properly graduated, of any desired length, and of a width to just slip easily into the groove *c*, is used, and there is also provided a bubble-glass or level, E, secured to a base, *e*, of similar width, but preferably of a length coinciding with the length of the groove *c*.

From this description the operation is evident. The nut N being loosened, either E or D is placed in the groove *c* in the disk C, and it is turned until the graduation-marks indicate the proper or desired angle. The nut N is then tightened, the united action of the beveled seat and the conical head of F tending to force the sides of *d* in F and *c'* and *c* toward each other, gripping them between the device placed therein, and at the same time locking C and B firmly together. If an aperture *i* has been made at such desired point, the tapering pin *p* may be passed through *h* into *i* and aid in holding them together and securing accuracy, it being proposed to have an aperture *i* at such points at least as indicate the angles most generally used. By this construction the square-protractor, and beveling devices and the bubble-glass or spirit-level may be readily, easily, and instantaneously interchanged for each other, so that a reliable instrument for all these classes of work is furnished in a small, compact, and comparatively economical organization. This, so far as I know, has not before been accomplished, although adjustable bevels have been made, and spirit-levels have been made in which there was a slight range of adjustment of the level relatively to its straight-edge, in order to compensate for any wear or abrasion of such straight-edge; but I know of nothing prior to my invention which showed provisions for interchanging these different classes of devices and adjusting both or either at any angle whatever to the straight-edge.

I do not claim herein the combination of a grooved ruler with a stock having a straight-edge, and with a revoluble divided limb arranged within such stock, and socketed segmentally to receive the ruler, and provided with a clamping screw and nut to hold it in place; nor a stock provided with a spirit-level, and with a straight-edge parallel thereto, in combination with a revoluble divided limb arranged within such stock, and socketed segmentally to receive a ruler, and provided with devices for clamping the said limb to the stock and the ruler to the limb; nor do I claim a stock provided with a straight-edge, and with grooves extending therefrom lengthwise and crosswise of the said stock, in combination with a revoluble limb arranged in the stock, and with a ruler, and extended both in the stock and limb, the limb and stock being provided with clamping devices; nor do I claim a stock having a straight-edge and longitudinal and lateral grooves and stop-screws arranged therewith, in combination with a revoluble limb and with a ruler and their clamping devices, as such subject-matters are shown and described in the prior application before referred to; but What I do claim herein is—

1. In a combination-instrument, the combination of a straight-edge, a recessed base supported therefrom, a disk capable of rotation therein, provided with a groove immediately upon one side of its median line, and means for securing the base and disk in any relative position, substantially as described.

2. In a combination-instrument, the combination of the recessed base suitably supported from a straight-edge, a grooved disk capable of rotation therein, and having a conical opening in its center, and a bevel-headed screw and nut for locking the two together, substantially as described.

3. In a combination-instrument, the recessed base, grooved disk capable of rotation therein, and the conical-headed screw having a portion of its head cut away to form part of the groove, substantially as described.

4. In a combination-instrument, the recessed base, having aperture *h* through its flange, the rotatable disk C, seated in the recessed base, and adapted to carry the rule or level, as described, and provided with apertures *i* in its periphery, extending inwardly at right angles to the axis of rotation, and the pin *p*, adapted to pass through *h* and take in one of the apertures *i*, substantially as described.

5. The combination of a bubble-glass or spirit-level, a strip upon which it is mounted, a rotatable disk grooved to receive the strip, and into or from which it may be readily placed or removed at will, a base supported from and by a straight-edge, and recessed upon its face to receive and support the disk, the disk being arranged to rotate therein, and means for clamping the bubble-glass or spirit-level at any desired angle whatever to the straight-edge, substantially as described.

In testimony whereof I have hereunto set my hand in the presence of two subscribing witnesses.

STEPHEN H. BELLOWS.

Witnesses:
D. A. NEWTON,
ANDREW J. HAMILTON.